July 7, 1964
G. T. BARTA ETAL
3,140,441
MAGNET TESTER UTILIZING A MOTOR-DRIVEN BALANCING NETWORK
TO DETERMINE PLURAL DISCRETE LEVELS OF ENERGY
Filed Nov. 16, 1960
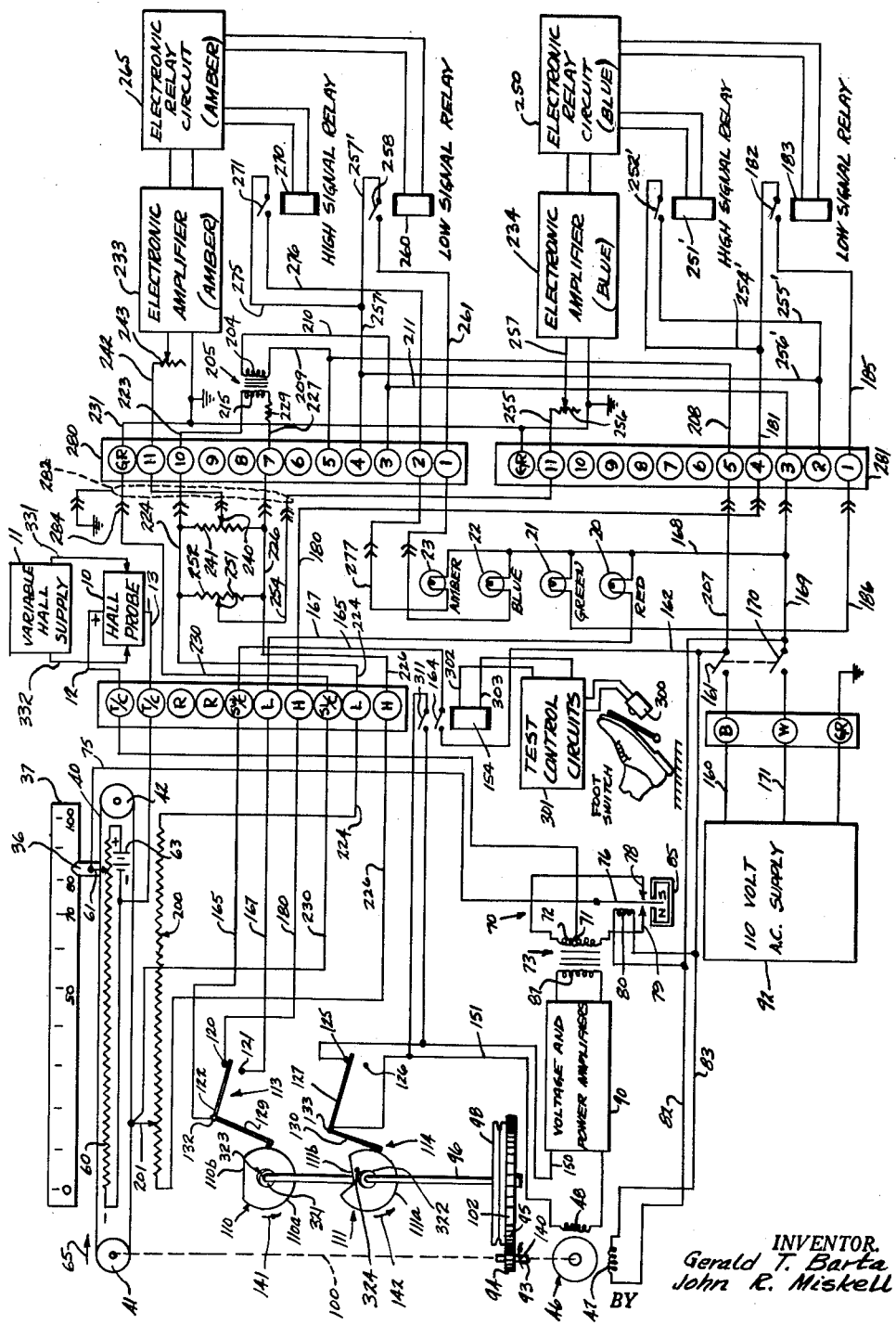
INVENTOR.
Gerald T. Barta
John R. Miskell
BY
Hill, Sherman, Meroni, Gross & Simpson
ATTORNEYS

United States Patent Office 3,140,441
Patented July 7, 1964

3,140,441
MAGNET TESTER UTILIZING A MOTOR-DRIVEN BALANCING NETWORK TO DETERMINE PLURAL DISCRETE LEVELS OF ENERGY
Gerald T. Barta and John R. Miskell, Valparaiso, Ind., assignors to Indiana General Corporation, Valparaiso, Ind., a corporation of Indiana
Filed Nov. 16, 1960, Ser. No. 69,642
5 Claims. (Cl. 324—34)

This invention relates to a system for testing the energy output of permanent magnets during production and particularly relates to a system for readily and conveniently classifying permanent magnets into a multiplicity of categories during the production process.

It is an important object of the present invention to provide a system for segregating magnetic products into a multiplicity of magnetic quality levels.

It is a further important object of the present invention to provide such a system which is especially adapted to operation by production personnel and yet which is sufficiently flexible so as to be adapted to a number of different test requirements.

Another object of the invention is to provide a system for segregating magnetic products into a multiplicity of magnetic quality levels wherein the transitions from successive quality levels are relatively precisely determined and are readily adjustable by production personnel in setting up the system for operation.

A still further object of the present invention is to provide an extremely rugged and reliable system for segregating magnetic products into magnetic quality levels which is easily maintained and which is capable of operating with extremely high reliability.

Other objects, features and advantages of the present invention will be apparent from the following detailed description taken in connection with the accompanying drawings, in which the single figure is a schematic illustration of the overall system in accordance with the present invention for segregating magnetic products into four magnetic quality levels.

As shown on the drawings:

The system illustrated in the single figure of drawings by way of example is one which has been developed for segregating permanent magnets into four quality levels. In operation of the system, successive permanent magnets are magnetized by means of a predetermined magnetizing field and then are placed in a test fixture so as to supply a magnetic field to a Hall probe element indicated diagrammatically by component 10. It will be understood that the test fixture may comprise a fixed pair of pole pieces operatively associated with a Hall element and arranged in such a manner that the permanent magnet to be tested can be placed in contact with the pole pieces to establish a magnetomotive force therebetween which is a measure of the quality of the permanent magnet. The magnetization of the permanent magnets may be carried out in a known manner so that the output of the permanent magnets as sensed by the Hall probe 10 will give an accurate indication of the quality of such magnets. The Hall probe 10 may be of conventional design and may be supplied with a direct current by means of Hall supply component indicated at 11. The Hall probe 10 thus delivers an output voltage between lines 12 and 13 which is a function of the magnetic field generated by the permanent magnet under test.

In the illustrated system, the permanent magnets under test are to be segregated into four groups. The group to which each successive magnet tested belongs is to be indicated, for example, by lighting of a different one of a series of lamps including a red lamp 20, a green lamp 21, a blue lamp 22 and an amber lamp 23 which are preferably located on a panel of the test instrument.

By way of example, one permanent magnet part in production which was made of Alnico V was to be segregated in quality levels having respective minimum energy values of 5.25, 5.75 and 6.00 (in arbitrary units). The correlation between measurements utilizing the present invention and laboratory tests was nearly perfect. In determining such correlation, a large group of such parts were first segregated into three groups by the system of the present invention utilizing master magnets having energy levels of 5.25, 5.75 and 6.00. The system was adjusted so that the 5.25 master when magnetized caused the red light to be extinguished and the green light to go on. The 5.75 master magnet caused energization of the blue light and the 6.00 master magnet caused the amber light to be turned on. The parts were then successively magnetized and placed in test position and grouped according to whether the green, blue or amber light was caused to turn on. The three groups thus obtained were then tested by accurate laboratory techniques and the following results were obtained (expressed in arbitrary units):

| Color of Light Associated With Group | Corresponding Minimum Energy Level | Relative Energy Output Measured in the Laboratory | | |
|---|---|---|---|---|
| | | Measured Value for Master Magnet | Range for Group | |
| | | | Minimum | Maximum |
| Green | 5.25 | 11.25 | 11.25 | 12.05 |
| Blue | 5.74 | 12.1 | 12.1 | 12.3 |
| Amber | 6.00 | 12.3 | 12.3 | 12.65 |

It will be noted that none of the magnets in a given quality level as segregated by the system of the present invention exceeded the minimum for the next higher quality level and none of the segregated magnets fell below the established minimum quality level for the group. The system in accordance with the present invention is found to provide accuracies comparable to those of the laboratory galvanometer, and to provide a readout time near .3 second and repeatability to within one-quarter of 1% or less.

The output from the Hall probe controls the position of a pointer 36 relative to a scale 37. In the diagrammatic illustration the pointer 36 is shown as secured to a cable 40 which is trained about pulleys 41 and 42. The cable 40 is driven by means of a balance motor 46 which may comprise a reversible, two-phase induction motor. The motor has a reference winding 47 and a control winding 48 which are energized by alternating currents. When the current in the control winding 48 leads the current in the reference winding 47 by 90°, the motor rotates in one direction, while when current in the control winding 48 lags the current in the reference winding 47 by 90°, the motor rotates in the opposite direction. In the illustrated embodiment, the motor forms part of a balance control system.

The balance system as diagrammatically illustrated may comprise a linear potentiometer 60 having a moving contact 61 which is driven by the motor 46 and is illustrated as being movable with the pointer 36 but electrically insulated therefrom. The potentiometer is connected with a constant voltage source which is diagrammatically illustrated as a battery 63 but which in practice may comprise a zener diode constant voltage source. The potentiometer 60 develops a voltage in series with the output voltage from the Hall probe 10 but of opposite polarity, so that when the pointer 36 is at a position corresponding to the magnitude of the output voltage from the Hall probe 10, a zero signal is supplied to the balance system and the motor 46 is stationary. If the pointer 36 is at too low a value on scale 37, potentiometer 60 will produce a voltage less in magnitude than the Hall output voltage and the motor 46 will be driven in a direction to move the pointer 37 upscale (in the direction indicated by arrow 65). On the other hand, if the Hall probe 10 is delivering on output voltage less in magnitude than the potentiometer 60, the error signal will be of opposite polarity and will result in driving the motor 46 in the opposite direction to move the pointer 36 downscale. The system operates continuously to maintain the pointer 36 at a precise position corresponding to the instantaneous output voltage from the Hall probe 10.

The balancing system further comprises a converter circuit 70 for producing an alternating current output of magnitude dependent on the difference between the Hall output voltage and the output of potentiometer 60 and of phase dependent upon the relative magnitudes of the Hall output and the potentiometer output. The system is such as to produce a current in the control winding 48 which is 90° leading or lagging with reference to the current in winding 47. Thus, the converter provides a phase shift of 180° when the polarity of the difference between the Hall output voltage and the potentiometer output voltage changes. In the specific circuit diagrammatically illustrated, lead 12 from the Hall probe 10 which is at a positive voltage relative to the lead 13 is connected to the center tap 71 of the primary 72 of a transformer 73. Line 13 which is relatively of negative polarity with respect to line 12 is connected to the negative side of potentiometer 60 which also corresponds to the negative side of the constant voltage source 63. The moving contact 61 of the potentiometer is connected by means of a line 75 to a vibrating reed 76 which alternatively connects the line 75 with lines 78 and 79. The reed 76 not only provides an electric circuit connecting line 75 with either line 78 or 79 depending on its position, but also comprises a magnetic material which is adapted to be energized by means of an alternating current winding 80 connected to alternating current lines 82 and 83. A permanent magnet 85 is adapted to cooperate with the reed 76 so that when the lower end of the reed as seen in the drawing assumes a south magnetic polarity it is attracted to the north magnetic pole of the permanent magnet 85 to close the circuit from line 75 to line 79, and when the reed 76 assumes a north magnetic polarity at its lower end, it is attracted to the south magnetic pole of the permanent magnet 85 to close the electric circuit from line 75 to line 78. It will be understood that the reed 76 will oscillate between its extreme positions in step with the alternating current waveform supplied to winding 80. The lines 78 and 79 are connected to the opposite terminals of the primary winding 72 so that any difference in magnitude between the Hall probe output and the potentiometer output is converted into an alternating current signal in the secondary 87 of transformer 73. This alternating current error signal is supplied to a voltage and power amplifier component 90 whose output is connected to the control winding 48 of motor 46. The output from component 90 will be zero when the Hall probe output equals the potentiometer output, and will be an alternating current signal of the supply frequency but 90° out of phase with respect to the current source 92 and lagging or leading depending on whether the Hall voltage or the potentiometer voltage is higher. If necessary, of course, suitable phase adjusting means may be incorporated in the component 90 to insure the 90° phase relationship between the error signal to winding 48 and the reference signal to winding 47 of the motor 46. As previously stated, the error signal produced by the balance system comprising converter 70 and component 90 is such as to null the error signal and maintain pointer 36 in exact correspondence with the Hall probe output.

By way of example of the actual physical construction of the indicator assembly including pointer 36 and scale 37, the scale 37 may have an eleven inch calibrated length. Cable 40 may comprise a taut stainless steel drive cable which is unaffected by temperature and humidity changes. The drive motor 46 may in the physical construction have a small pinion gear on its shaft driving a relatively large gear wheel. The carriage for the pointer 36 and the drive for the potentiometer contact 61 are preferably directly connected to the balancing motor at all times, making it impossible for these units to get out of phase with each other. This has been diagrammatically illustrated in FIGURE 1 by showing the contact 61 rigidly connected with the pointer 36. A practical linear potentiometer such as indicated at 60 may be completely enclosed and oil immersed if desired. A helical type may be utilized which is 25 inches long and has 1600 convolutions.

To generally illustrate some of the components of an actual physical embodiment, the motor shaft for motor 46 has been indicated at 93 for driving a pinion 94. Pinion 94 meshes with a drive gear wheel 95 which is mounted on a shaft such as indicated at 96 and may have rigidly secured therewith a drive pulley 98. In a practical embodiment, the cable 40 may be wrapped 360° about the pulley 98 to provide a positive drive for the cable directly from the motor shaft 93 without any possibility of slippage. This type of mechanical coupling between pulley 98 and cable 40 is diagrammatically indicated by the dash line 100 in FIGURE 1. The diameter of the pulley 98 may be such that slightly less than one revolution thereof produces travel of the pointer 36 the full scale distance, for example 11 inches. Thus, the circumference of the pulley 98 is preferably slightly greater than the desired linear travel of the pointer 36. Suitable positive stop means such as radially projecting lug 102 on the drive wheel 95 which engages pinion 94 at each extreme of travel of the pointer 36, is provided for limiting travel of the pointer 36 to the desired distance.

Cams 110 and 111 may be adjustably mounted on the shaft 96 of gear wheel 95. These cams make approximately one revolution over the operative range of travel of the pointer 36. The angular position of cams 110 and 111 on shaft 96 is adjustable to correspondingly adjust the respective values of Hall output voltage at which switch means 113 and 114 are actuated. By way of example, switch 113 may include a pair of stationary contacts 120 and 121 and a movable contact arm 122 while switch 114 may comprise stationary contacts 125 and 126 and a movable contact arm 127. The switches further comprise respective actuating arms 129 and 130 which may be of resilient material so as to resiliently bias the movable contact arms 122 and 127 against the stationary contacts 120 and 125 while the arms are riding on the large diameter portions 110a and 111a of the cams. The switch assemblies 113 and 114 may have their movable parts biased to rotate in the clockwise direction about pivot points 132 and 133 so that when the small radius portions 110b and 111b of the cams are presented to the free ends of the actuating arms 129 and 130, the movable contacts 122 and 127 are resiliently biased into engagement with the stationary contacts 121 and 126 which serve to limit the clockwise rotation of the movable parts of the switches. By way of example, if pointer 36 is initially in a position corresponding to 65 units on scale 37, both arms 129 and 130 will be cooperating with the small radius portions 110b and 111b of the cams and the movable contacts 122 and 127 will be engaging stationary contacts 121 and 126. As the motor 46 is rotated in the forward direction as indicated by arrow 140 on shaft 93 cams 110 and 111 will rotate in the direction of arrows 141 and 142. For example, when the pointer 36 reaches 70 on the scale 37, cam 111 may actuate arm 130 to close contacts 127 and 125 of switch 114. Thereafter, when pointer 36 indicates 80 units on scale 37, contacts 120, 122 of switch 113 may be closed. It will be understood that the cams 110 and 111 are individually angularly adjustable on shaft 96, so that for another test procedure, switch 114 might be actuated at 50 scale units of scale 37 and switch 113 might be actuated at 72 units on scale 37. In the illustrated embodiment, switch 114 serves to limit the travel of the pointer 36 in the downscale direction, for example for a zero Hall output voltage from probe 10. The switch 113 may be utilized to extinguish the red light and light the green light at a predetermined value of Hall output voltage.

Referrring first to the detailed circuit associated with switch 114, it will be observed that output line 150 from amplifier component 90 is connected to stationary contact 125 of switch 114 while line 151 is connected to movable contact 127 and extends to control winding 48. Thus, with relay 154 deenergized, contacts 125, 127 control energization of winding 48, and stop the motor 46 when the pointer 36 travels in the downscale direction to a predetermined downscale limit position, for example at 65 units on scale 37. By angular adjustment of cam 111 with respect to shaft 96, the point at which control winding 48 is open circuited may be adjusted. Switch 113 controls energization of red lamp 20 and green lamp 21. With contacts 121 and 122 in engagement, a circuit extends from the supply 92 through line 160, switch contact 161, when closed, line 162, relay contact 164 of relay 154, when the relay is energized, line 165, movable contact 122 of switch 113, stationary contact 121, line 167, red lamp 20, line 168, line 169, switch contact 170, when closed, and line 171 from supply component 92. Lines 160 and 171 may have a 60 cycle, 110 volt voltage applied thereacross which will then energize lamp 20. When the pointer 36 travels past the limit position determined by the angular relationship of cam 110 to shaft 96, contact 122 of switch 113 closes with stationary contact 120 to deenergize red lamp 20 and energize the green lamp 21 through the following circuit:

From line 160 through contact 161, line 162, relay contact 164, line 165, movable contact 122 of switch 113, stationary contact 120, line 180, line 181, relay contact 182 of low signal relay 183, line 185, line 186, green lamp 21, line 168, line 169, switch contact 170 and line 171.

The blue lamp 22 is controlled by alternating current circuit including a linear potentiometer 200 having a movable contact 201 which is diagrammatically indicated as being insulatingly supported by the belt 40. In practice the potentiometer 200 may be of the helical type driven from shaft 93 of motor 46, for example. The potentiometer 200 may be part of two alternating current balance circuits energized by means of a transformer 205. Primary 204 of the transformer is energized from the supply 92 through the following circuit:

Line 160, switch 161, line 207, line 208, line 209, primary 204, line 210, line 211, line 169, switch 170 and line 171.

The secondary 215 of transformer 205 is connected with the potentiometer 200 through the following circuit:

Line 223, line 224, potentiometer 200, line 226, line 227 and resistor 229.

Movable contact 201 of the potentiometer is connected by means of line 230 and line 231 to the input of each of amplifier components 233 and 234. The moving contact 240 of a potentiometer 241 is connected to the other input of amplifier 233 via line 242 and variable resistor 243, the potentiometer 241 being connected between lines 224 and 226 in parallel with the potentiometer 200. A moving contact 251 of a potentiometer 252 is connected to the second input of amplifier 234 via line 254, line 255, variable resistor 256 and line 257. Adjustment of movable contacts 240 and 251 thus determines the balance point of the two balance circuits with respect to the inputs to amplifiers 233 and 234. The amplifier 234 drives an electronic relay circuit 250. For positions of the movable contact 201 of potentiometer 200 below a predetermined point, relay circuit 250 maintains low signal relay 183 energized and contact 182 closed. At a predetermined position of movable contact 201 of potentiometer 200, relay circuit 250 deenergizes relay 183 and energizes a high signal relay 251' to close a contact 252'. This action breaks the energizing circuit for the green lamp 21 and closes an energizing circuit for the blue lamp 22 as follows:

Line 160, line 162, contact 164, line 165, contacts 122, 120 of switch 113, line 180, line 181, line 254', relay contact 252' of relay 251', line 255', line 256', line 257', contact 258 of low signal relay 260, line 261, blue lamp 22, line 168, and line 171.

The electronic relay circuit 265 controls a low signal relay 260 and a high signal relay 270 having a normally open contact 271. When the moving contact 201 of potentiometer 200 reaches a relatively high position with respect to scale 37, circuit 265 will deenergize relay 260 and energize relay 270 extinguishing the blue lamp 22 and lighting the amber lamp 23 through the following circuit:

Line 160, line 162, relay contact 164, line 165, contacts 122, 120 of switch 113, line 180, line 181, line 254', relay contact 252' of high signal relay 251', line 255', line 256', line 257', line 275, contact 271 of relay 270, line 276, line 277, amber lamp 23, line 168 and line 171.

The electronic amplifier and relay circuit components 233, 234, 250 and 265 for controlling relays 183, 251', 260 and 270 may be of conventional commercial design known per se. For example, such components may comprise electronic voltage detector relays available from Minneapolis-Honeywell Regulator Company as Model W406A. Each such commercially available component comprises an electronic amplifier, a sensitivity control corresponding to variable resistor 243, a transformer such as indicated at 205, the electronic relay circuit which is phase sensitive corresponding to component 265, two load relays such as indicated at 260 and 270 and a terminal strip such as that indicated at 280 or 281. The input leads of the alternating current balance circuit are indicated as being shielded by dash line 282 which is suitably grounded, and suitable connector plugs may be utilized to connect the remainder of the circuit to the electronic relay component as indicated by the symbol at 284.

Relay 154 is controlled by means of a foot switch 300 which is connected with a test control circuit component 301. By way of example, the component 301 may receive alternating current power from component 92, and may include suitable rectifier means for delivering direct current power. In one condition of the test control circuits, the direct current power may be connected directly to the relay 154 as indicated by lines 302 and 303 under the control of the foot switch 300 so that relay 154 remains energized as long as the foot switch 300 is actuated. In another condition of the test control circuits component 301, a thyratron time delay circuit is interposed which prevents energizing relay 154 until a predetermined time delay after the test part has been magnetized by means of the test control circuits component. It is desirable in some types of magnetic testing to insure a time delay between magnetizing of the part under test and the testing of the magnet by the system of the present invention. Suitable variable resistance capacitance means in the grid of the thyratron tube may select the desired time delay. With the test control circuits component 301 conditioned by means of a selector switch to provide a time delay after magnetizing, the grid of the thyratron tube is maintained at a cut-off potential by means of a switch ganged with the switch controlling the application of magnetizing current to the part to be tested. When the magnetizing switch is opened, the switch in the thyratron grid circuit is opened, and a positive potential is allowed to build up across a capacitor in the thyratron grid circuit until the thyratron is biased to conducting condition. The relay 154 under this condition of operation is connected in the plate circuit of the thyratron so as to be actuated only after a predetermined time delay following the magnetizing step.

It may be noted that while by way of example, potentiometer 60 has been indicated as being connected directly to the converter circuit 70, the potentiometer 60 may alternatively be part of a bridge circuit with the constant voltage source 63 connected between one pair of opposite terminals of the bridge and with the movable contact 61 serving to produce an unbalanced voltage at the other pair of output terminals of the bridge equal and opposite to the Hall output voltage when pointer 36 reaches the correct position corresponding to the instantaneous Hall output voltage.

*Procedure for Setting the System of the Present Invention Into Operation*

In setting up the apparatus of the present invention, the downscale stop cam 111 is angularly adjusted on the shaft 96 so as to stop the pointer 36 at a downscale reading, for example, of approximately 65. The red-green light transition cam 110 is angularly adjusted on the shaft 96 for example to a normal scale reading of 80 divisions on the scale 37. The Hall supply 11 may then be adjusted with a master permanent magnet corresponding to the red-green adjustment in the test position until the system is just operative to switch from the red light to the green light. In one apparatus in accordance with the present invention, three Hall supply controls labeled "sensitivity," "coarse" and "fine" were provided to precisely adjust the Hall output voltage with a magnet just meeting the minimum quality level for the green lamp in the test position. The master test magnet corresponding to the minimum quality level for lighting the blue light is then inserted into the test position, and potentiometer 252 controlling the input level to amplifier 234 is adjusted until the green light is extinguished and the blue light energized while maintaining the Hall supply values constant. Next, the magnet corresponding to the minimum quality for the amber group is inserted into the test setup, and potentiometer 241 is adjusted so that this master magnet is just operative to extinguish the blue light and light the amber light.

It will be observed that cams 110 and 111 need only be occasionally adjusted, and that in the course of production testing, the instrument may be readily calibrated by means of the manual controls controlling the Hall supply component 11 and potentiometers 241 and 252.

For illustrative purposes, cams 110 and 111 are shown as having integral collar portions 321 and 322 integral collar portions 321 and 322 receiving set screws 323 and 324 which may be loosened to accommodate angular adjustment of the cams relative to shaft 96. The cam contours shown in the drawings are, of course, diagrammatic, and in an actual design, the notch surfaces 110b and 111b would be less sharply angled from surfaces 110a and 111a, for example, to facilitate camming of arms 129 and 130 in the counterclockwise direction as the cams rotate in the direction of arrows 141 and 142 from the downscale stop position.

The variable Hall supply component 11 may be energized from supply 92 and may comprise a transformer, a 500 milliampere full wave silicon rectifier component, a 6 volt 2000 microfarad capacitor and helipot potentiometer in parallel across the output of the rectifier component, the potentiometer serving as a voltage divider type "sensitivity" control. In series with the movable contact of the sensitivity control potentiometer is a "coarse" adjustment variable resistor (comprising a potentiometer with its movable contact connected to one end terminal thereof) and a "fine" adjustment variable resistor assembly (including a 15 ohm 5 watt fixed resistor in parallel with a potentiometer whose movable contact is connected to one end terminal of the potentiometer). A further 4.5 ohm 5 watt fixed resistor may be in series with the "coarse" and "fine" adjustment elements just described which are all part of a series circuit including leads 331 and 332 and Hall probe 10.

*Summary of Operation*

In conducting a test operation, each magnet part to be tested is inserted into the magnetizing device and magnetized to saturation. Foot switch 300 is then depressed to operate relay 154. This relay supplies power to the red-green light microswitch 113 by means of its contact 164 and also closes a contact 311 to connect control winding 48 to the output of the voltage and power amplifiers component 90. With the magnet part exerting its output magnetic field on the Hall probe 10 and suitable operating voltages supplied to the probe 10 by means of the supply component 11, the Hall output voltage to be measured will appear between leads 12 and 13. At the start of a test operation, pointer 36 will be at some low value such as 65 on the scale 37, and switches 113 and 114 will be cooperating with the reduced radius portions 110b and 111b of cams 110 and 111.

Since initially the Hall probe 10 will produce a higher output voltage than moving contact 61 of potentiometer 60, motor 46 will drive the cable 40 and pointer 36 in the upscale direction as indicated by arrows 65 and 140 and will drive cams 110 and 111 in the direction of arrows 141 and 142. At a predetermined point along scale 37, switch 114 will be actuated to close contacts 125, 127 which are in parallel with the relay contact 311. At a further point in the progress of pointer 36 in the upscale direction, switch 113 will be actuated to extinguish the red light 20 and energize the green lamp 21. This transition may indicate that the output from the Hall probe 10 exceeds a minimum acceptable value. If the magnet part fails to extinguish the red light and energize the green lamp, the magnet part may be discarded, for example. The pointer 36 will come to rest at a point along the scale 37 corresponding to the energy output from the magnet part under test, and at this time one of the lamps 20–23 will be lit to indicate the quality level of the magnet part. The part under test thus may readily be segregated into one of four quality levels corresponding to lamps 20–23 with virtually no possibility of error on the part of the operator. When the quality level of the part under test has been determined, the foot switch 300 is released and the test magnet removed from its test location. The output from the Hall probe 10 is now zero so that the motor 46 drives the pointer 36 in the downscale direction. When cam 111 deactuates switch 114, the output circuit between voltage and power amplifiers component 90 and control winding 48 is broken to stop motor 46. It will be understood that the cam 111 may be angularly adjusted so as to stop motor 46 when the pointer 36 is just below the red-green transition level so as to enable successive tests to be made with maximum speed.

It will be apparent that many modifications and variations may be effected without departing from the scope of the novel concepts of the present invention.

We claim as our invention:

1. A magnet tester comprising transducer means for sensing the magnetic energy output of successive magnet parts to be tested and for producing an electric output signal in accordance with the magnetic energy output from the magnet part under test, output means for assuming a plurality of successive positions in accordance with the magnetic energy output from the magnet part under test, circuit means coupled to said transducer means and to said output means for controlling the position of said output means in accordance with said electric output signal, indicating means for indicating that the magnetic energy output from the magnet part under test exceeds a predetermined level, and electric transition signalling means coupled to said output means and to said indicating means for actuating said indicating means upon said output means reaching a predetermined position corresponding to said predetermined level of magnetic energy output from the magnet part under test, said output means comprising an electric motor and an output shaft driven by said electric motor, said circuit means comprising shaft position signalling means coupled to said output shaft for generating a shaft position signal in accordance with the position of said output shaft and balance means for maintaining a balanced relationship between the value of the transducer electrical output signal from said transducer means and the value of the shaft position signal, said balance means being responsive to a difference between said transducer electrical output signal and said shaft position signal to drive said electric motor in a direction tending to bring the shaft position signal into balance with said transducer electrical output signal, said electric transition signalling means being mechanically coupled to said output shaft and being mechanically driven thereby through a series of positions as the transducer electrical output signal progressively approaches a stable value reflecting the energy output from the magnet part under test, said transition signalling means having a critical position corresponding to a predetermined level of magnetic energy output from the magnet part under test at which said transition signalling means is actuated for actuating said indicating means.

2. A magnet tester comprising transducer means for sensing the magnetic energy output of successive magnet parts to be tested and for producing an electric output signal in accordance with the magnetic energy output from the magnet part under test, output means for assuming a plurality of successive positions in accordance with the magnetic energy output from the magnet part under test, circuit means coupled to said transducer means and to said output means for controlling the position of said output means in accordance with said electric output signal, indicating means for indicating that the magnetic energy output from the magnet part under test exceeds a predetermined level, electric transition signalling means coupled to said output means and to said indicating means for actuating said indicating means upon said output means reaching a predetermined position corresponding to said predetermined level of magnetic energy output from the magnet part under test, and electric stop means coupled to said output means and to said circuit means for deenergizing said circuit means when the output means reaches a stop position corresponding to a magnetic energy output from the magnet part under test below the range of magnetic energy outputs to be measured to stop said output means at said stop position whenever a magnet part is removed from said transducer means.

3. A magnet tester comprising transducer means for sensing the magnetic energy output of successive magnet parts to be tested and for producing an electric output signal in accordance with the magnetic energy output from the magnet part under test, output means for assuming a plurality of successive positions in accordance with the magnetic energy output from the magnet part under test, circuit means coupled to said transducer means and to said output means for controlling the position of said output means in accordance with said electric output signal, first indicating means for indicating that the electric output signal exceeds a first predetermined level, electric switch means coupled to said output means and controlling an actuating circuit for said first indicating means for actuating said first indicating means upon said output means reaching a first predetermined position corresponding to a first predetermined quality level for said magnet parts, variable impedance means coupled to said output means for producing an effective impedance which varies with the position of said output means, second indicating means for indicating that the electric output signal exceeds a second predetermined level, and electronic relay means coupled to said variable impedance means and to said second indicating means and shiftable from one output condition to a second output condition to actuate said second indicating means when said variable impedance means produces a predetermined effective impedance corresponding to a second predetermined position of said output means and corresponding to a second predetermined quality level of the magnet part under test.

4. A magnet tester comprising transducer means for sensing the magnetic energy output of successive magnet parts to be tested and for producing an electric output signal in accordance with the magnetic energy output from the magnet part under test, output means for assuming a plurality of successive positions in accordance with the magnetic energy output from the magnet part under test, circuit means coupled to said transducer means and to said output means for controlling the position of said output means in accordance with said electric output signal, first indicating means for indicating that the electric output signal exceeds a first predetermined level, electric switch means coupled to said output means and controlling an actuating circuit for said first indicating means for actuating said first indicating means upon said output means reaching a first predetermined position corresponding to a first predetermined quality level for said magnet parts, variable impedance means coupled to said output means for producing an effective impedance which varies with the position of said output means, second indicating means for indicating that the electric output signal exceeds a second predetermined level, and electronic relay means coupled to said variable impedance means and to said second indicating means and shiftable from one output condition to a second output condition to actuate said second indicating means when said variable impedance means produces a predetermined effective impedance corresponding to a second predetermined position of said output means and corresponding to a second predetermined quality level of the magnet part under test, said electronic relay means having contacts in the actuating circuit for the first indicating means accommodating actuation of the first indicating means in said one output condition of said electronic relay means but preventing actuation of said first indicating means in said second output condition whereby the first indicating means is deactuated and the second indicating means is actuated when the electronic relay means is shifted from said one output condition to said second output condition.

5. A magnet tester comprising transducer means for sensing the magnetic energy output of successive magnet parts to be tested and for producing an electric output signal in accordance with the magnetic energy output from the magnet part under test, output means comprising an electric motor and an output shaft driven thereby for assuming a plurality of successive positions in accordance with the magnetic energy output from the magnet part under test, circuit means coupled to said transducer means and to said output means for controlling the position of said output means in accordance with said electric output signal, indicating means for indicating that the magnetic energy output from the magnet part under test exceeds a predetermined level, and electric transition signalling means coupled to said output means and to said indicating means for actuating said indicating means upon said output means reaching a predetermined position corresponding to said predetermined level of magnetic energy output from the magnet part under test, said circuit means comprising shaft position signalling means coupled to said output shaft for generating a shaft position signal in accordance with the position of said output shaft and balance means for maintaining a balanced relationship between the value of the transducer electrical output signal from said transducer means and the value of the shaft position signal, said balance means being responsive to a difference between said electrical output signal from said transducer means and the shaft position signal to drive said electric motor in a direction tending to bring the shaft position signal into balance with said transducer electrical output signal, said transition signalling means comprising a cam mounted on said shaft and mechanically driven thereby and electric switch means controlled by said cam for actuation at a predetermined angular position of said cam.

References Cited in the file of this patent
UNITED STATES PATENTS

| | | |
|---|---|---|
| 2,459,341 | Russell | Jan. 18, 1949 |
| 2,959,733 | Koch et al. | Nov. 8, 1960 |